(12) United States Patent
Varada et al.

(10) Patent No.: US 12,437,149 B2
(45) Date of Patent: Oct. 7, 2025

(54) GUIDING AND VALIDATING DOCUMENT SUBMISSIONS

(71) Applicant: INTERNATIONAL BUSINESS MACHINES CORPORATION, Armonk, NY (US)

(72) Inventors: Sri Harsha Varada, Vizianagaram (IN); Afroz Khan I, Davanagere (IN); Venkata Vara Prasad Karri, Visakhapatnam (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/653,538

(22) Filed: Mar. 4, 2022

(65) Prior Publication Data

US 2023/0281386 A1    Sep. 7, 2023

(51) Int. Cl.
*G06F 40/226* (2020.01)
*G06F 40/106* (2020.01)
*G06T 11/00* (2006.01)

(52) U.S. Cl.
CPC .......... *G06F 40/226* (2020.01); *G06F 40/106* (2020.01); *G06T 11/00* (2013.01)

(58) Field of Classification Search
CPC ....... G06F 40/226; G06F 40/106; G06T 11/00
See application file for complete search history.

(56) References Cited

U.S. PATENT DOCUMENTS

| | | | |
|---|---|---|---|
| 5,692,073 A * | 11/1997 | Cass | G06V 30/1444 358/468 |
| 10,699,145 B1 | 6/2020 | Bertrand | |
| 2005/0065893 A1* | 3/2005 | Josephson | G06Q 40/02 705/64 |
| 2008/0091780 A1* | 4/2008 | Balan | H04L 63/0428 709/204 |
| 2011/0173560 A1* | 7/2011 | Larcheveque | G06F 40/221 715/780 |
| 2012/0066032 A1* | 3/2012 | Snider | G06Q 30/0203 705/12 |

(Continued)

FOREIGN PATENT DOCUMENTS

WO    WO-03102798 A1 * 12/2003 ........... G06F 17/243

OTHER PUBLICATIONS

Mell et al., "The NIST Definition of Cloud Computing", National Institute of Standards and Technology, Special Publication 800-145, Sep. 2011, pp. 1-7.

*Primary Examiner* — Shahid K Khan
(74) *Attorney, Agent, or Firm* — Gavin Giraud

(57) ABSTRACT

A method, computer program, and computer system are provided for validating document submissions. A data entry in a data entry field associated with a document associated with a user is identified. A set of validation rules associated with the document is accessed. A determination is made as to whether the identified data entry complies with the accessed set of validation rules. Based on determining that at least a portion of the identified data entry does not comply with a subset of validation rules from among the set of validation rules, feedback is provided to the user corresponding to the portion of the identified data entry that does not comply with the subset of validation rules.

18 Claims, 6 Drawing Sheets

(56) References Cited

U.S. PATENT DOCUMENTS

| | | | |
|---|---|---|---|
| 2014/0267074 A1* | 9/2014 | Balci | G06F 9/451 |
| | | | 345/173 |
| 2017/0060540 A1 | 3/2017 | Allen | |
| 2017/0200234 A1* | 7/2017 | Morse | G06F 40/143 |
| 2017/0249059 A1* | 8/2017 | Houseworth | G10L 15/26 |
| 2017/0337625 A1* | 11/2017 | Rosenblatt | G06Q 20/3829 |
| 2018/0032286 A1 | 2/2018 | Panda | |
| 2018/0032855 A1* | 2/2018 | Wang | G06Q 30/04 |
| 2019/0179934 A1* | 6/2019 | Gogineni | G06F 3/04842 |
| 2019/0354720 A1 | 11/2019 | Tucker | |
| 2020/0065912 A1* | 2/2020 | Bender | G10L 17/00 |

* cited by examiner

GUIDING AND VALIDATING DOCUMENT SUBMISSIONS

FIELD

This disclosure relates generally to field of machine learning, and more particularly to natural language processing in electronic documents.

BACKGROUND

The submission of documents to a company, government agency, licensing body, or the like by an individual typically involves complying with the unique requirements of the document. For example, an application for a license may require an individual to include specific pieces of information in a particular format, while a job application to a company, on the other hand, requires different specific pieces of information in a different particular format. When an individual uploads such a document, the document and its contents may be verified as to its compliance with the unique requirements of the submission and validated to confirm adherence to the requirements for the document.

SUMMARY

Embodiments relate to a method, system, and computer readable medium for validating document submissions. According to one aspect, a method for validating document submissions is provided. The method may include identifying a data entry in a data entry field associated with a document associated with a user. A set of validation rules associated with the document is accessed. A determination is made as to whether the identified data entry complies with the accessed set of validation rules. Based on determining that at least a portion of the identified data entry does not comply with a subset of validation rules from among the set of validation rules, feedback is provided to the user corresponding to the portion of the identified data entry that does not comply with the subset of validation rules.

According to another aspect, a computer system for validating document submissions is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a data entry in a data entry field associated with a document associated with a user. A set of validation rules associated with the document is accessed. A determination is made as to whether the identified data entry complies with the accessed set of validation rules. Based on determining that at least a portion of the identified data entry does not comply with a subset of validation rules from among the set of validation rules, feedback is provided to the user corresponding to the portion of the identified data entry that does not comply with the subset of validation rules.

According to yet another aspect, a computer readable medium for validating document submissions is provided. The computer readable medium may include one or more computer-readable storage devices and program instructions stored on at least one of the one or more tangible storage devices, the program instructions executable by a processor. The program instructions are executable by a processor for performing a method that may accordingly include identifying a data entry in a data entry field associated with a document associated with a user. A set of validation rules associated with the document is accessed. A determination is made as to whether the identified data entry complies with the accessed set of validation rules. Based on determining that at least a portion of the identified data entry does not comply with a subset of validation rules from among the set of validation rules, feedback is provided to the user corresponding to the portion of the identified data entry that does not comply with the subset of validation rules.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
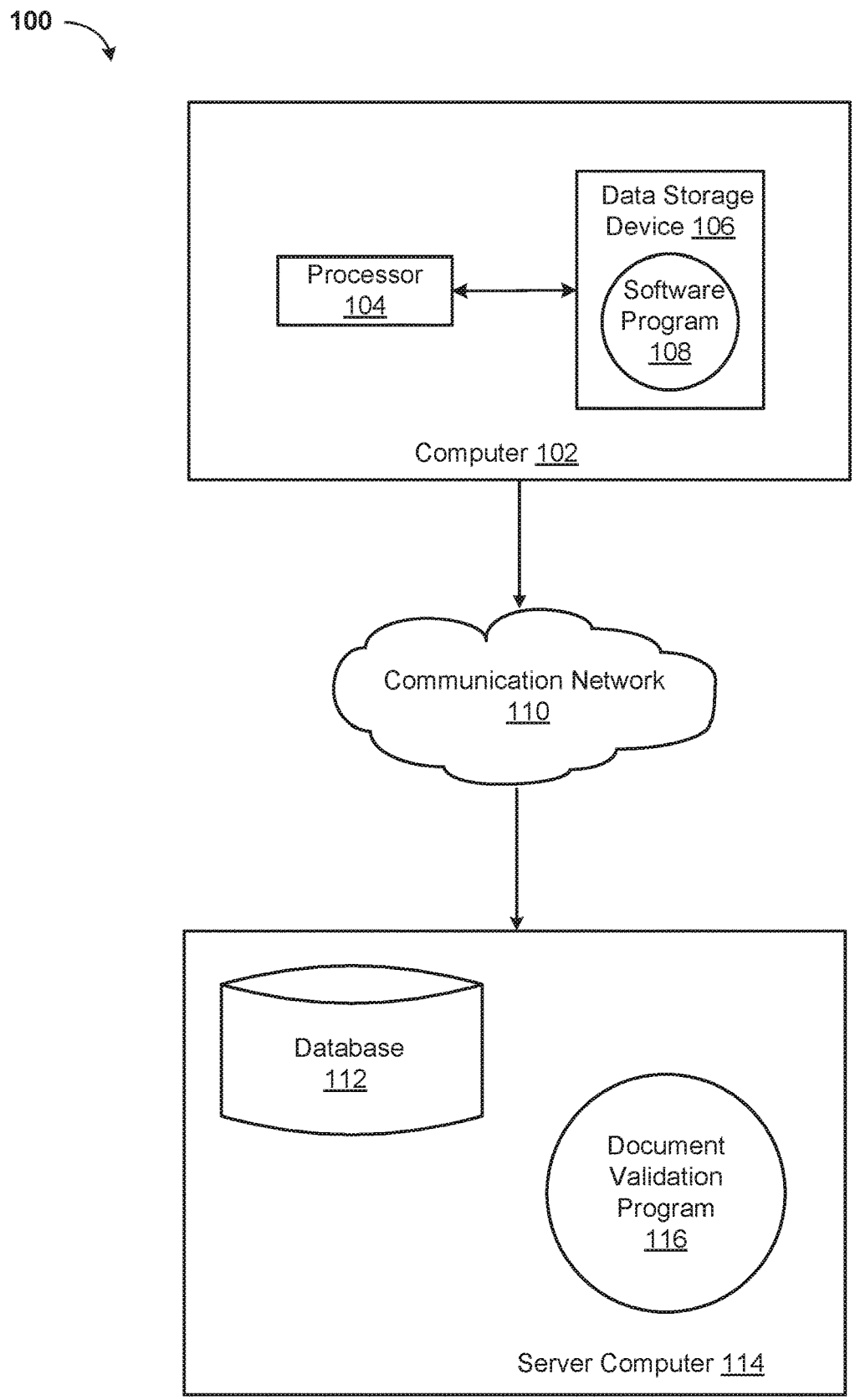
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of computing, and more particularly to data processing. The following described exemplary embodiments provide a system, method and computer program to, among other things, identify anomalies within a document prior to submission and potential rejection of the document. Therefore, some embodiments have the capacity to improve the field of computing by allowing for computers to parse documents for violations of rules and provide recommendations to bring the document into compliance with such rules.

As previously described, the submission of documents to a company, government agency, licensing body, or the like by an individual typically involves complying with the unique requirements of the document. For example, an application for a license may require an individual to include specific pieces of information in a particular format, while a job application to a company, on the other hand, requires different specific pieces of information in a different particular format. When an individual uploads such a document, the document and its contents may be verified as to its compliance with the unique requirements of the submission and validated to confirm adherence to the requirements for the document. Over the course of one's lifetime, an individual accumulates several documents that are often used for legal and transactional purposes, such as identification documents, passports, driver licenses, invoices, and bank transaction documents. In order to meet certain business requirements, the individual must present a set of predetermined documents. For example, in order to obtain a loan from a financial institution, an individual must have to go through rigorous scrutiny that may require waiting for days or weeks.

However, in such cases post-submission, validation done against the submitted document with anomalies or missing data may cause the document to be rejected, which may in turn lead to a loss of time and resources. It may be advantageous, therefore, to validate the accuracy of a document's contents at the time of submission in order to avoid such a scenario. This may be done by comparing a document submission against a certain objective in real-time by scrutinizing the document submission at the source (such as when the user completes and submits the document) and providing useful insights to the user in terms of a visual representation or textual feedback. Determining whether the requirements of the document have been met and providing feedback may be performed through usage computer vision and/or natural language processing.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that may validate submitted documents for compliance with rules set by the authority for which the document is intended. This may be done by using an object classifier built with artificial intelligence and machine learning tools that has the capability to determine under what circumstances an individual is uploading a document. The system, method and computer program may determine such circumstances based on pre-training and a document validation engine based on computer vision and/or natural language processing. The engine may be pre-trained with the capability to identify issues which may lead to potential rejection of the document for its business objective and may, thus, alert the user to errors even before the document is received and processed.

Referring now to FIG. 1, a functional block diagram of a networked computer environment illustrating a document validation system 100 (hereinafter "system") for guiding and validating submitted form documents. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for guiding and validating document submissions is enabled to run a Document Validation Program 116 (hereinafter "program") that may interact with a database 112. The Document Validation Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger document validation program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
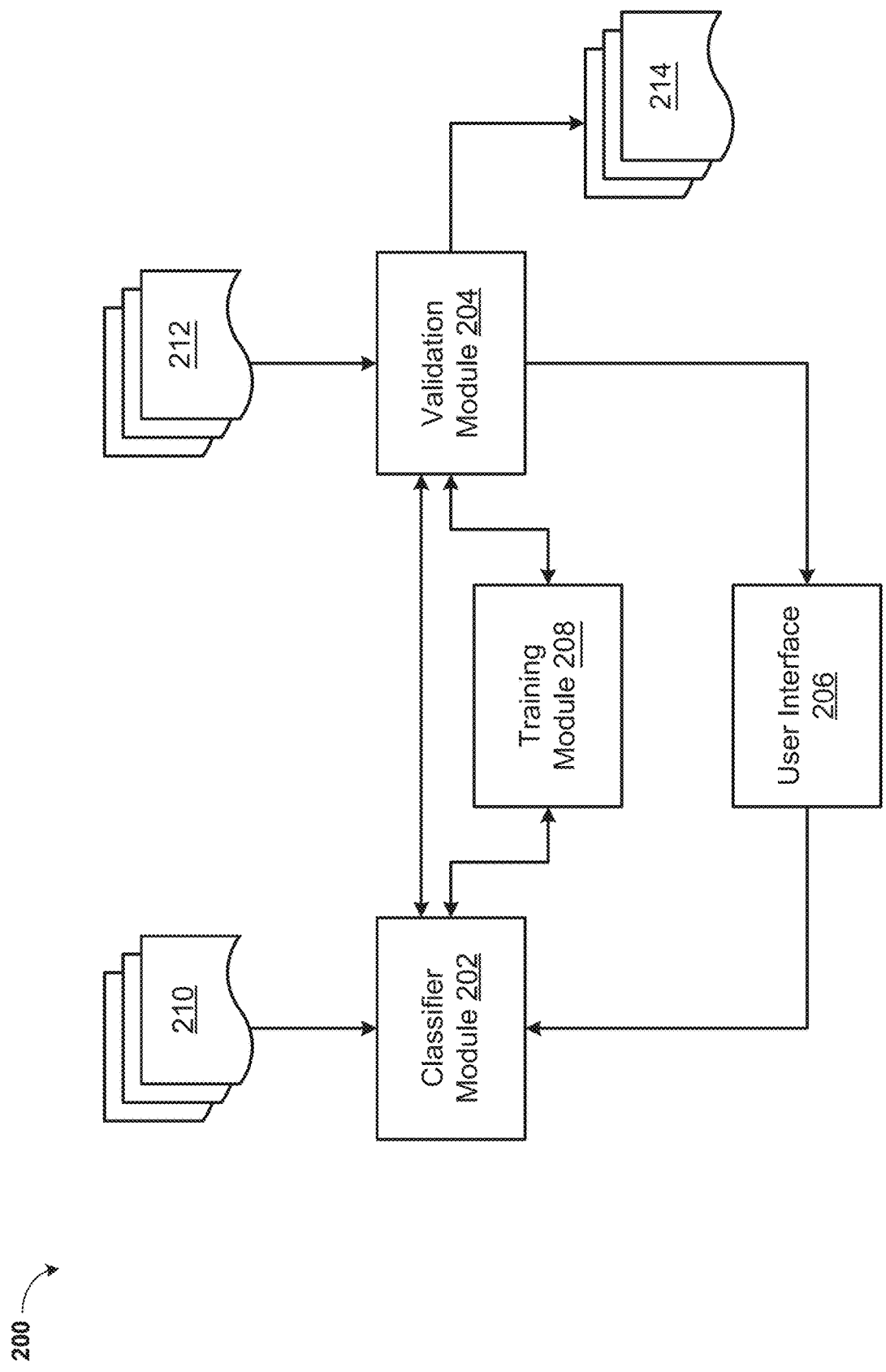
FIG. 2 is a block diagram of a system for validating document submissions, according to at least one embodiment.

Referring now to FIG. 2, a block diagram of a system 200 for validating document submissions is depicted according to one or more embodiments. The system 200 may include, among other things, a classifier module 202, a validation module 204, a user interface 206, and a training module 208.

The classifier module 202 may be configured to receive persona identifiers data 210 as input. The persona identifiers data 210 may include, among other things, location data, recently visited websites, social media activities, financial transactions, or the like. This data may allow the classifier module to determine a purpose or context with the document. The classifier module 202 may be configured to dynamically identify a context in which the user is attempting to perform certain submissions in order to accomplish certain objectives based on the persona identifier data 210. For example, by using location data and social media data, the classifier module 202 may identify a user completing a document to determine whether an appropriate document is being completed for an applicable entity. The classifier module 202 may receive an upload from the user entered via the user interface 206. The classifier module 202 may receive requirement data corresponding to the document submission. The classifier module 202 may make use of substantially any artificial intelligence technology for the classification, such as natural language processing. However, it may be appreciated that substantially any artificial intelligence system capable of being trained in accordance with the business objective requirement producing classification by ingesting the persona identifiers data 210.

The validation module 204 may validate the user's document prior to submission of the document. Specifically, the validation module may validate the elements of the document identified by the classifier module 202, such as detecting data entries made into data entry fields within the document. The validation module 204 may identify anomalies and other issues within the document that may lead to potential rejection of the document. The validation module 204 may also receive validation rules data 212 as input. The validation rules data 212 may include, among other things, format requirements (e.g., portable document format), picture dimensions and content rules (e.g., no smiling), font type and size requirements, or the like. In cases where the validation rules may be confidential or subject to other restrictions, the validation module 204 may only receive the validation rules data 212 after a validation token associated with the document and issued by an owner of the document (i.e., government agency, corporation, etc.) has been detected. The validation module 204 may validate the document in the cloud or at the client side. The processing of the document is achieved, in various embodiments, by an AI model trained with computer vision working in coherence with natural language processing techniques. The validation module 204 may additionally output validation data 214. The validation data 214 may include, among other things, anomalies present within the document, such as missing content or incorrect formatting. The validation module 204 may output a report that may include, among other things, these anomalies, the rules associated with the anomalies, and suggestions on how to bring the document in compliance with the rules.

The user interface 206 may display information related to validation of the document to a user. Specifically, the user interface 206 may generate tool tips of code snippet on the submitted document in real-time based on the understanding of the document to be uploaded as determined by the validation module 204. The user interface 206 may display an augmented reality overlay on top of the document that may highlight an area of anomaly in the document through, for example, text highlighting, changing colors within the document, drawing boxes around anomalies, or the like. This overlay may be generated on-the-fly in real-time if computational requirements are met by the device. Alternatively, should the device not meet the computational requirements, a pre-generated overlay may be generated by a separate computer and displayed on the device. The overlay may be displayed on substantially any capable display device, such as a smartphone, laptop or desktop computer, tablet computer, smart television, or the like.

The training module 208 may be used to train the models of the classifier module 202 and the validation module 204. Specifically, the training module 208 may process similar documents in a supervised or unsupervised fashion and may generate an engine for performing the document validation functions. For example, the training module 208 may review large quantities of training documents, such as loan applications or license forms, and self-trains to spot errors. The training module 208 may also learn from documents submitted by user to the classifier module 202 and the validation module 204 for developing more accurate results. The training module 208 may allow for the system 200 to provide useful insights in terms of a visual representation or textual feedback through usage computer vision and natural language processing. Document validation is pretrained with a computer vision model that uses a similar set of documents to obtain any kind of difference between documents, and the computer vision model may work in tandem with the natural language processing model to determine textual issues present within the documents.

Figure 3:
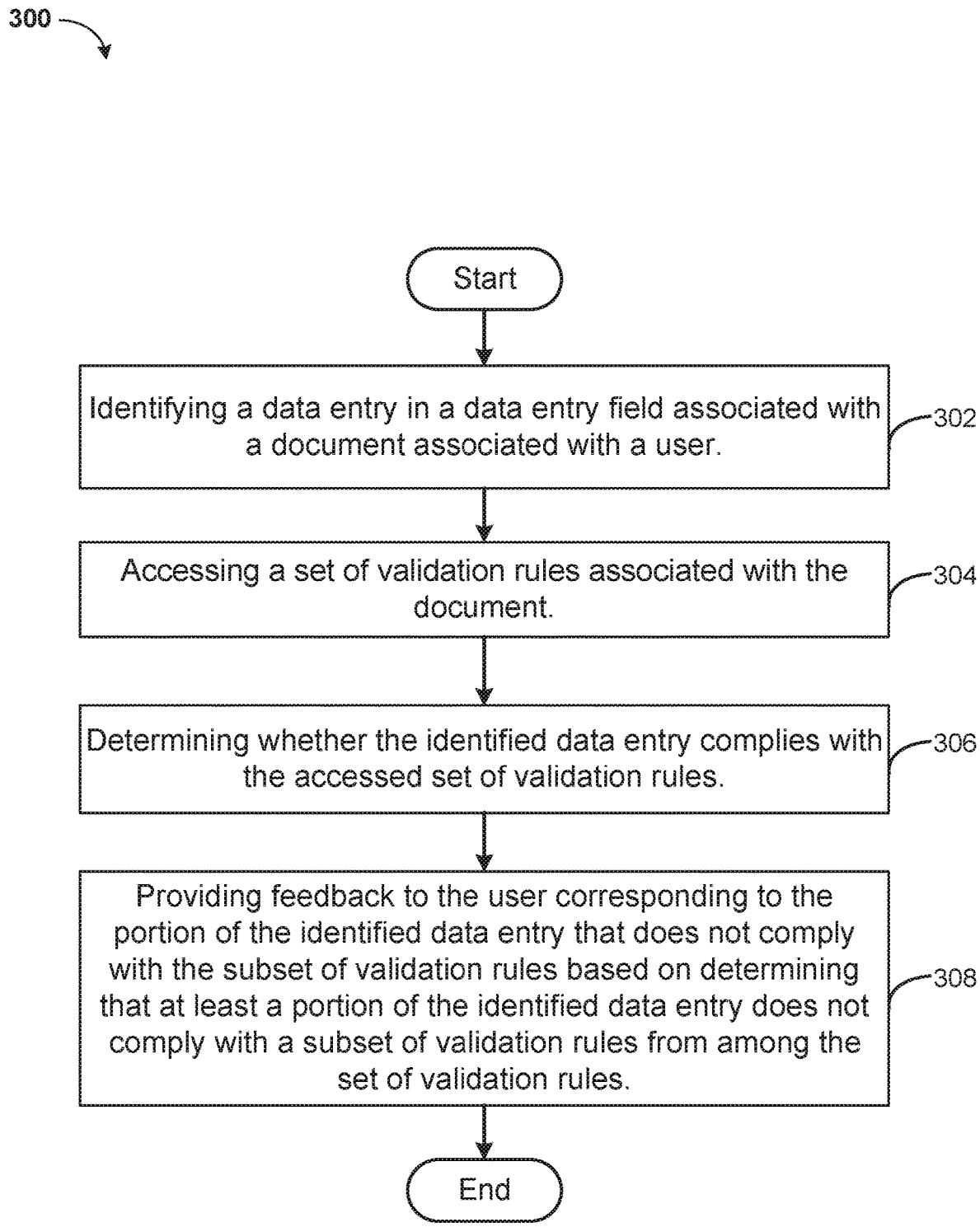
FIG. 3 is an operational flowchart illustrating the steps carried out by a program that validates document submissions, according to at least one embodiment.

Referring now to FIG. 3, an operational flowchart illustrating the steps of a method 300 carried out by a program that validates document submissions is depicted. The flowchart of FIG. 3 may be described with the aid of the exemplary embodiments of FIG. 2.

At 302, the method 300 may include identifying a data entry in a data entry field associated with a document associated with a user. The data to be identified may be determined from a context associated with the document. In operation, the classifier module 202 (FIG. 2) may receive a document from the user interface 206 (FIG. 2) and may determine a context for which a user in completing and submitting the document. The context may be determined based on the persona identifiers data 210 (FIG. 2).

At 304, the method 300 may include accessing a set of validation rules associated with the document. The validation rules data may be received from a governing body or other source at the time of document submission or may be retrieved from cache memory. The validation rules data may correspond to format or content requirements for the document to be submitted. In operation, the validation module 204 (FIG. 2) may receive validation rules data 212 (FIG. 2) associated with the document based on the context identified by the classifier module 202 (FIG. 2).

At 306, the method 300 may include determining whether the identified data entry complies with the accessed set of validation rules. For example, it may be detected that an incorrect format is used or that content is incorrect or missing from the document. In operation, the validation module 204 (FIG. 2) compares the document to the validation rules data 214 (FIG. 2) in order to determine whether or not the document complies with the validation rules.

At 308, the method 300 may include providing feedback to the user corresponding to the portion of the identified data entry that does not comply with the subset of validation rules. The feedback is provided through natural language processing or computer vision techniques based on determining that at least a portion of the identified data entry does not comply with a subset of validation rules from among the set of validation rules. The feedback may include, for example, an augmented reality overlay displayed over the document on a display device. In operation, the validation module 204 (FIG. 2) may determine that content is missing from the document. The user interface 206 (FIG. 2) may generate an augmented reality overlay to be displayed over the document highlighting to the user that content is missing from the document. Alternatively, it may be recognized that a device associated with the user interface 206 may not meet computational requirements for generating an augmented reality overlay in real-time and may be incapable of generating the augmented reality overlay. A pre-rendered document with augmented reality overlay may be used for display by the user interface 206. The user may then re-upload the document through the user interface 206.

It may be appreciated that FIG. 3 provides only an illustration of one implementation and does not imply any limitations with regard to how different embodiments may be implemented. Many modifications to the depicted environments may be made based on design and implementation requirements.

Figure 4:
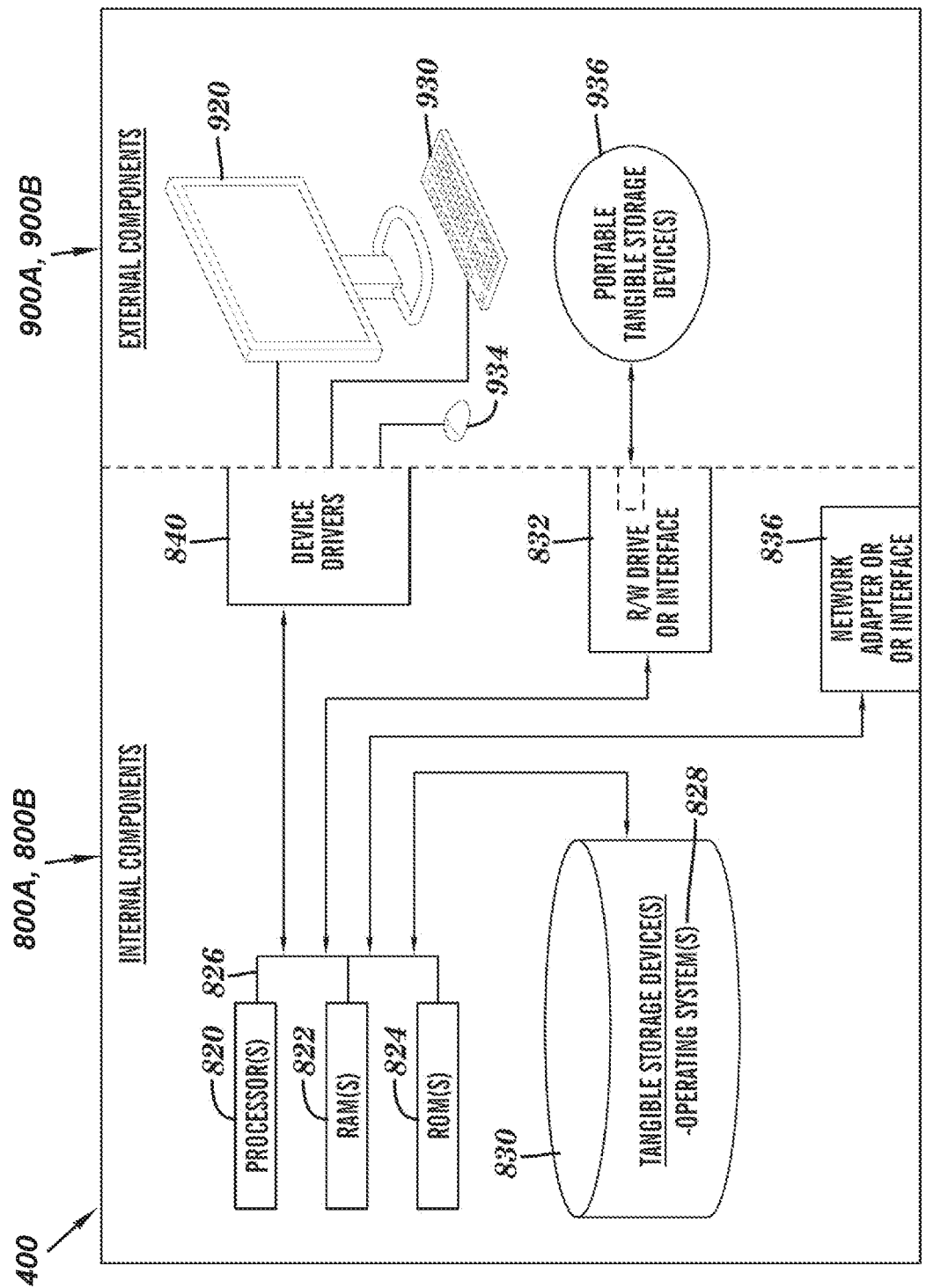
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
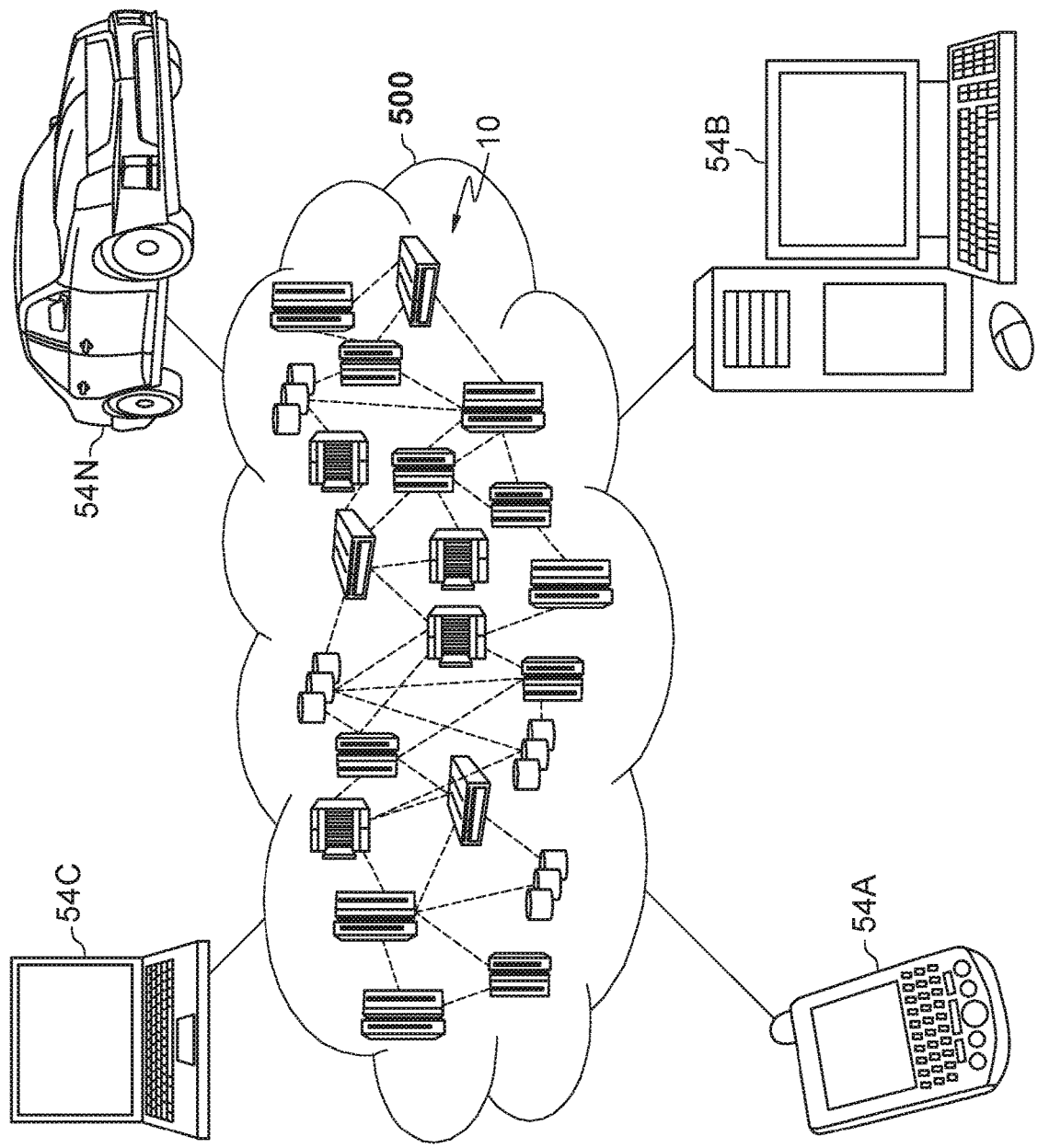
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. The one or more buses 826 includes a component that permits communication among the internal components 800A,B.

The one or more operating systems 828, the software program 108 (FIG. 1) and the Document Validation Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a RAY drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Document Validation Program 116 (FIG. 1) can be stored on one or more of the respective portable computer-readable tangible storage devices 936, read via the respective RAY drive or interface 832 and loaded into the respective hard drive from among the computer-readable tangible storage devices 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Document Validation Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Document Validation Program 116 on the server computer 114 are loaded into the respective hard drive from among the computer-readable tangible storage devices 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
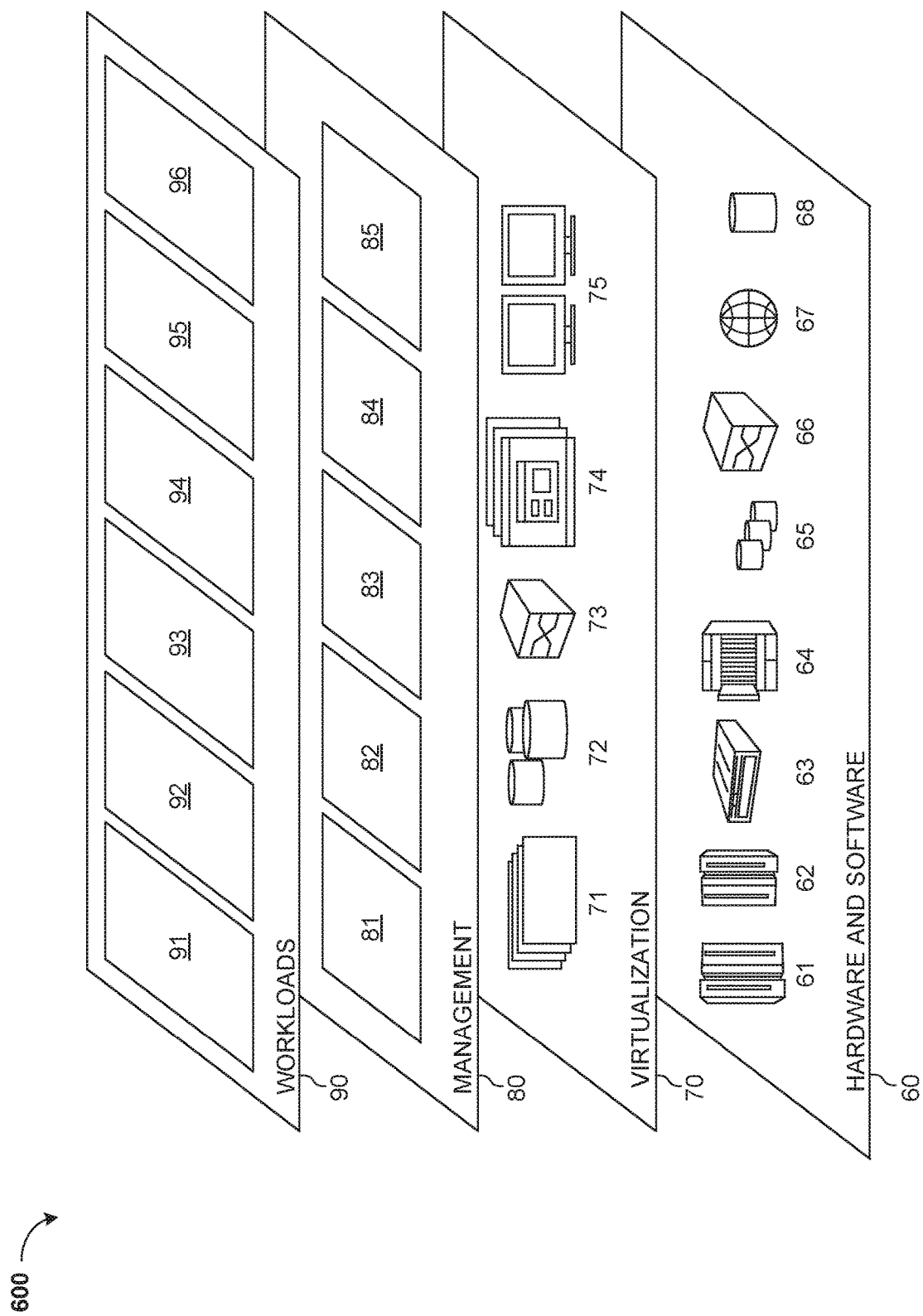
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Document Validation 96. Document Validation 96 may guide and validate submitted form documents.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an upload of a document, wherein the document includes data entries in data entry fields of the document and the document is associated with a user;
   identifying a first data entry in a first data entry field of the document associated with a user, wherein:
      the data entry is identified based on a persona identifier used to determine a context in which the document has been submitted; and
      a determination is made that the document is an appropriate document being completed for an applicable entity based on the context;
   identifying a second data entry in a second data entry field of the document;
   requesting a set of validation rules associated with the document through a cloud, wherein the set of validation rules comprises non-numerical requirements specific to the first data entry field and different from the second data entry field;
   detecting that the set of validation rules is confidential;
   in response to a request from the cloud, inputting a validation token associated with the document that is issued by an owner of the document and received from the user;
   determining that the identified data entry fails to comply with the set of validation rules; and
   responsive to determining that the identified data entry fails to comply with a validation rule of the set of validation rules, providing feedback to the user corresponding to the data entry that fails to comply with the validation rule.

2. The computer-implemented method of claim 1, wherein the feedback is provided with an augmented reality overlay displayed over the document, the augmented reality overlay highlighting the data entry that fails to comply with the validation rule.

3. The computer-implemented method of claim 2, further comprising:
   determining computational requirements associated with generating the augmented reality overlay; and
   displaying a pre-generated overlay based on the determined computational requirements not being met.

4. The computer-implemented method of claim 2, further comprising:
   displaying the augmented reality overlay over a display device selected from the group consisting of: a smartphone, a laptop computer, a desktop computer, a tablet computer, and a smart television.

5. The computer-implemented method of claim 1, wherein the persona identifier is selected from the group consisting of: recently visited websites, social media activities, and financial transactions associated with the user.

6. The computer-implemented method of claim 1, further comprising generating a report corresponding to one or more anomalies in the document associated with failing to comply with the validation rule.

7. A computer system comprising:
   a processor set;
   a set of one or more computer-readable storage media; and
   program instructions, collectively stored in the set of one or more storage media, for causing the processor set to perform the following computer operations:

receive an upload of a document, wherein the document includes data entries in data entry fields of the document and the document is associated with a user;

identify a first data entry in a first data entry field of the document associated with a user, wherein:
  the data entry is identified based on a persona identifier used to determine a context in which the document has been submitted; and
  a determination is made that the document is an appropriate document being completed for an applicable entity based on the context;

identifying a second data entry in a second data entry field of the document;

requesting a set of validation rules associated with the document through a cloud, wherein the set of validation rules comprises non-numerical requirements specific to the first data entry field and different from the second data entry field;

detecting that the set of validation rules is confidential;

in response to a request from the cloud, inputting a validation token associated with the document that is issued by an owner of the document and received from the user;

determining that the identified data entry fails to comply with the set of validation rules; and responsive to determining that the identified data entry fails to comply with a validation rule of the set of validation rules, providing feedback to the user corresponding to the data entry that fails to comply with the validation rule.

8. The computer system of claim 7, wherein the feedback is provided with an augmented reality overlay displayed over the document, the augmented reality overlay highlighting the data entry that fails to comply with the validation rule.

9. The computer system of claim 8, further comprising:
program instructions, collectively stored in the set of one or more storage media, for causing the processor set to perform the following computer operations:
  determine computational requirements associated with generating the augmented reality overlay; and
  display a pre-generated overlay based on the determined computational requirements not being met.

10. The computer system of claim 9, further comprising:
program instructions, collectively stored in the set of one or more storage media, for causing the processor set to perform the following computer operations:
  display the augmented reality overlay over a display device selected from the group consisting of: a smartphone, a laptop computer, a desktop computer, a tablet computer, and a smart television.

11. The computer system of claim 7, wherein the persona identifier is selected from the group consisting of: recently visited websites, social media activities, and financial transactions associated with the user.

12. The computer system of claim 7, further comprising:
program instructions, collectively stored in the set of one or more storage media, for causing the processor set to perform the following computer operations:
  generate a report corresponding to one or more anomalies in the document associated with failing to comply with the validation rule.

13. A computer program product comprising:
a set of one or more computer readable storage media;
program instructions, collectively stored in the set of one or more storage media, for causing a processor set to perform the following computer operations:
  receive an upload of a document, wherein the document includes a data entry in a data entry field of the document and the document is associated with a user;
  identify a first data entry in a first data entry field of the document associated with a user, wherein:
    the data entry is identified based on a persona identifier used to determine a context in which the document has been submitted; and
    a determination is made that the document is an appropriate document being completed for an applicable entity based on the context;
  identify a second data entry in a second data entry field of the document;
  request a set of validation rules associated with the document through a cloud, wherein the set of validation rules comprises non-numerical requirements specific to the first data entry field and different from the second data entry field;
  detect that the set of validation rules is confidential;
  in response to a request from the cloud, inputting a validation token associated with the document that is issued by an owner of the document and received from the user;
  determine that the identified data entry fails to comply with the set of validation rules; and
  responsive to determining that the identified data entry fails to comply with a validation rule of the set of validation rules, provide feedback to the user corresponding to the data entry that fails to comply with the validation rule.

14. The computer program product of claim 13, wherein the feedback is provided with an augmented reality overlay displayed over the document, the augmented reality overlay highlighting the data entry that fails to comply with the validation rule.

15. The computer program product of claim 14, further comprising:
program instructions, collectively stored in the set of one or more storage media, for causing the processor set to perform the following computer operations:
  determine computational requirements associated with generating the augmented reality overlay; and
  display a pre-generated overlay based on the determined computational requirements not being met.

16. The computer program product of claim 13, wherein the persona identifier is selected from the group consisting of: recently visited websites, social media activities, and financial transactions associated with the user.

17. The computer readable medium of claim 13, further comprising:
program instructions, collectively stored in the set of one or more storage media, for causing the processor set to perform the following computer operations:
  generate a report corresponding to one or more anomalies in the document associated with failing to comply with the validation rule.

18. The computer-implemented method of claim 1, wherein the validation rules correspond to a selection from the group consisting of: a picture dimension, a font type requirement, and a font size requirement.

* * * * *